United States Patent
Tseng et al.

(10) Patent No.: US 12,331,812 B2
(45) Date of Patent: Jun. 17, 2025

(54) ACTUATOR DEVICE

(71) Applicant: TOYO AUTOMATION CO., LTD., Tainan (TW)

(72) Inventors: Kun-Cheng Tseng, Tainan (TW); Ming-Chi Su, Tainan (TW)

(73) Assignee: TOYO AUTOMATION CO., LTD., Tainan (TW)

( * ) Notice: Subject to any disclaimer, the term of this patent is extended or adjusted under 35 U.S.C. 154(b) by 13 days.

(21) Appl. No.: 18/510,389

(22) Filed: Nov. 15, 2023

(65) Prior Publication Data

US 2025/0003468 A1 Jan. 2, 2025

(30) Foreign Application Priority Data

Jun. 29, 2023 (TW) .................................. 112124342

(51) Int. Cl.
*F16H 57/04* (2010.01)
*F16H 25/12* (2006.01)

(52) U.S. Cl.
CPC ........... *F16H 25/12* (2013.01); *F16H 57/042* (2013.01)

(58) Field of Classification Search
CPC ............. F16H 57/0456; F16H 57/0497; F16H 2025/2075; F16H 2025/204; F16H 2025/2034
See application file for complete search history.

(56) References Cited

U.S. PATENT DOCUMENTS

| | | | | |
|---|---|---|---|---|
| 5,454,278 A | * | 10/1995 | Kasuga | F16H 57/0497 184/5 |
| 6,138,550 A | * | 10/2000 | Fingar, Jr. | F04B 43/0054 92/103 SD |
| 9,228,646 B2 | * | 1/2016 | Geppert | F16H 25/12 |
| 10,094,463 B2 | * | 10/2018 | Heipt | F16H 25/2015 |
| 2015/0330497 A1 | * | 11/2015 | Amano | F16H 57/0497 74/89.41 |

FOREIGN PATENT DOCUMENTS

JP 5968732 B2 8/2016
JP 6025625 B2 11/2016

* cited by examiner

*Primary Examiner* — Gregory Robert Weber
(74) *Attorney, Agent, or Firm* — MLO, a professional corp.

(57) ABSTRACT

An actuator device includes a base body that defines a receiving space. A first end subunit has a ventilation hole, a first oil injection hole, and a first oil injection nozzle extending from the first oil injection hole into the receiving space. A second end subunit is connected to the base body. A sliding unit is slidable relative to the base body, and has a slide table, a nut seat connected to the slide table, and a connection hole connected to the slide table and the base body. A pressure relief unit is mounted in the ventilation hole for allowing air to be discharged from the receiving space to an external environment. A driving unit is operable for driving movement of the sliding unit.

7 Claims, 12 Drawing Sheets

ACTUATOR DEVICE

CROSS-REFERENCE TO RELATED APPLICATION

This application claims priority to Taiwanese Patent Application No. 112124342, filed on Jun. 29, 2023, which is incorporated herein by reference in its entirety.

FIELD

The disclosure relates to a linear actuating device, and more particularly to an actuator device.

BACKGROUND

An actuator device, as disclosed in JP6025625, includes a moisture absorbing unit for reducing moisture inside thereof.

As shown in FIGS. 11 and 12, another actuator device, as disclosed in JP5968732, is easily assembled/disassembled. Dustproof and waterproof abilities of the actuator device of JP5968732 are enhanced. Regarding the actuator device of JP5968732, a front cover seal member 41 is clamped between a housing body 5 of a housing 3 and a front bracket 23a. A rear cover seal member 62 is clamped between the housing body 5 and a rear cover 9.

With enhanced waterproof and dustproof abilities, the actuator of JP 5968732 may prevent foreign objects, water droplets and dust from entering the housing 3 through two opposite ends of the housing body 5. Specifically, a first rod seal member 33 and a second rod seal member 35 are provided to the front bracket 23a. The first rod seal member 33 is disposed outside the housing 3, and the second rod seal member 35 is disposed inside the housing 3. Therefore, even if foreign objects and water droplets enter through a gap between the first rod seal member 33 and a rod 85, the second seal member 35 may prevent foreign objects and water droplets from entering the housing 3. In addition, a soft wiper 33e is disposed at a rear end of an inner peripheral surface of the first rod seal member 33. The first rod seal member 33 is wiped by the soft wiper 33e, so foreign objects and water droplets may be collected between the first rod seal member 33 and the second rod seal member 35. The first rod seal member 33 and the second rod seal member 35 may prevent grease and abrasion powder generated in the housing 3 from falling outside the housing 3.

SUMMARY

Therefore, an object of the disclosure is to provide an actuator device that can be waterproof and dustproof and that can allow air to be discharged to an external environment.

According to the disclosure, an actuator device includes a base unit, a sliding unit, a pressure relief unit, and a driving unit.

The base unit includes a base body, a first end subunit, and a second end subunit. The base body extends in a longitudinal direction and defines a receiving space. The first end subunit is connected to the base body, and has a ventilation hole adapted to communicate the receiving space with an external environment, a first oil injection hole, and a first oil injection nozzle extending from the first oil injection hole into the receiving space. The second end subunit is opposite to the first end subunit in the longitudinal direction and is connected to the base body.

The sliding unit is mounted to the base unit, is slidable in the longitudinal direction relative to the base unit, and has a slide table, a nut seat, and a connection hole. The nut seat is connected to the slide table. The connection hole is aligned with the first oil injection nozzle, and is connected to the slide table and the base unit.

The pressure relief unit is mounted in the ventilation hole and is operable for allowing air discharge in a unidirectional manner from the receiving space to the external environment.

The driving unit is mounted to the base unit, and is operable for driving movement of the sliding unit in the longitudinal direction (X) relative to the base unit.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
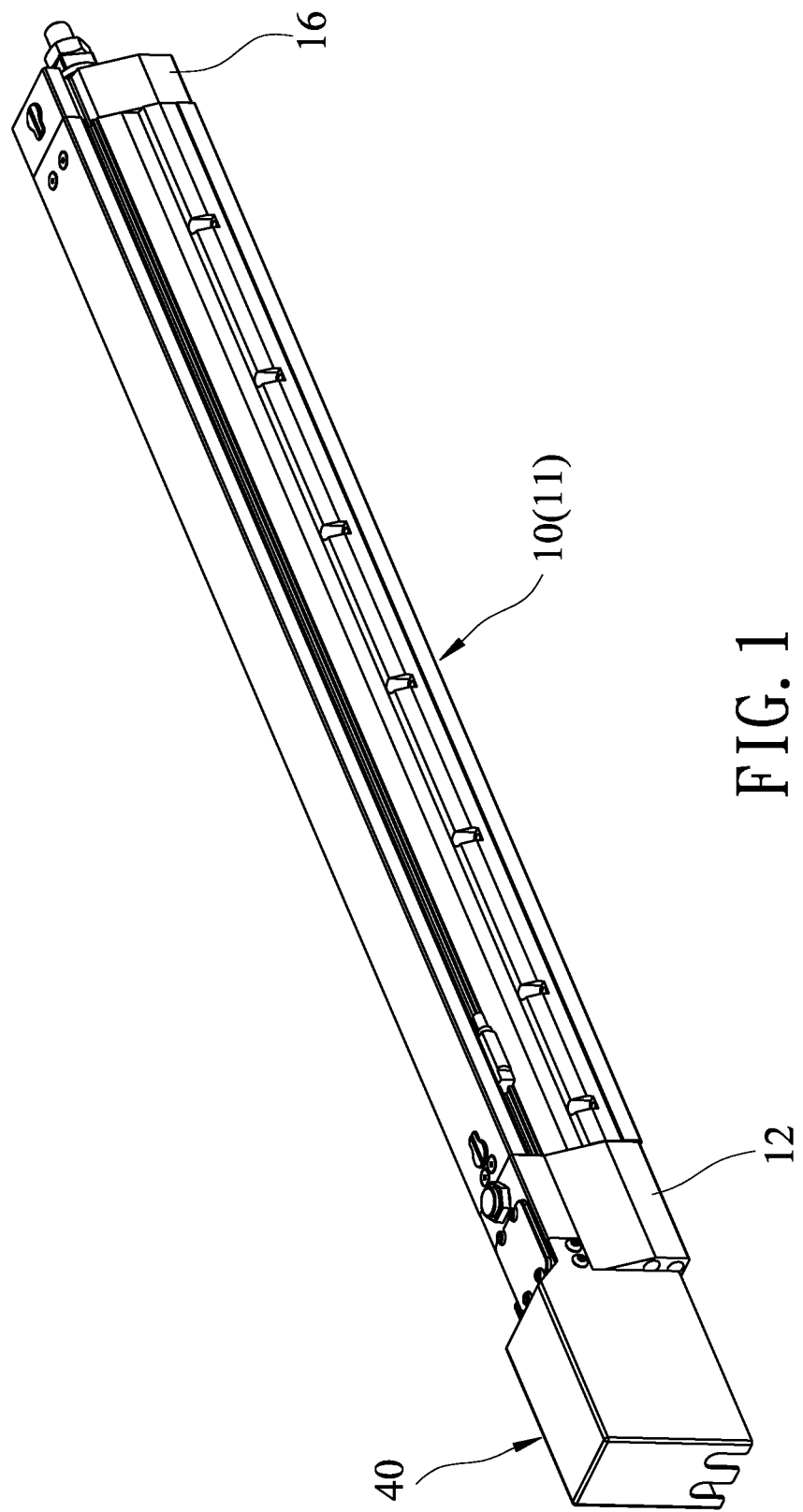
FIG. 1 is a perspective view illustrating an actuator device according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
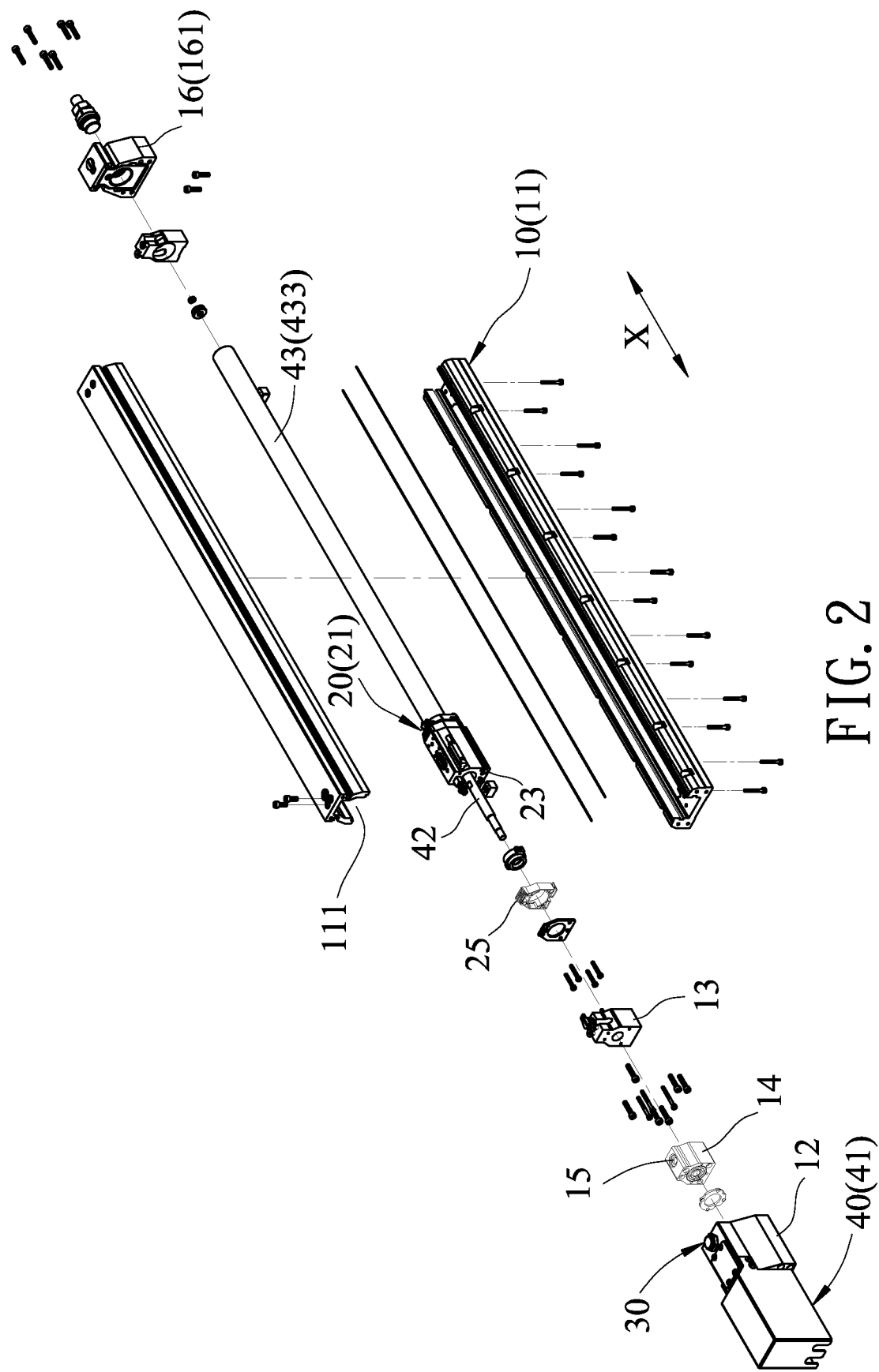
FIG. 2 is an exploded perspective view illustrating the actuator device of the embodiment.

FIGS. 1 and 2 illustrate an actuator device according to an embodiment of the disclosure. The actuator device of the disclosure includes a base unit 10, a sliding unit 20, a pressure relief unit 30, and a driving unit 40.

Referring to FIGS. 5 to 7 and 9 in combination with FIGS. 1 and 2, the base unit 10 includes a base body 11, a first end subunit 12, and a second end subunit 16.

The base body 11 extends in a longitudinal direction (X) and defines a receiving space 111.

The first end subunit 12 is connected to the base body 11, and has an oil injection seat 13, a first oil injection hole 131, a first oil injection nozzle 132, an air discharge seat 14, and a ventilation hole 15. The oil injection seat 13 is fixed to the base body 11. The first oil injection hole 131 is formed in the oil injection seat 13 to communicate the receiving space 111 with an external environment. The first oil injection nozzle 132 extends from the first oil injection hole 131 into the receiving space 111. The air discharge seat 14 is fixed to the oil injection seat 13 and is opposite to the base body 11. The ventilation hole 15 is adapted to communicate the receiving space 111 with the external environment. In this embodiment, the ventilation hole 15 has a first hole segment 151 that is formed in the air discharge seat 14, and a second hole segment 152 that is formed in the oil injection seat 13. The first hole segment 151 of the ventilation hole 15 has a longitudinal part 153 that extends through the air discharge seat 14 in the longitudinal direction (X), and a transverse part 154 that is transverse to the longitudinal part 153.

Figure 7:
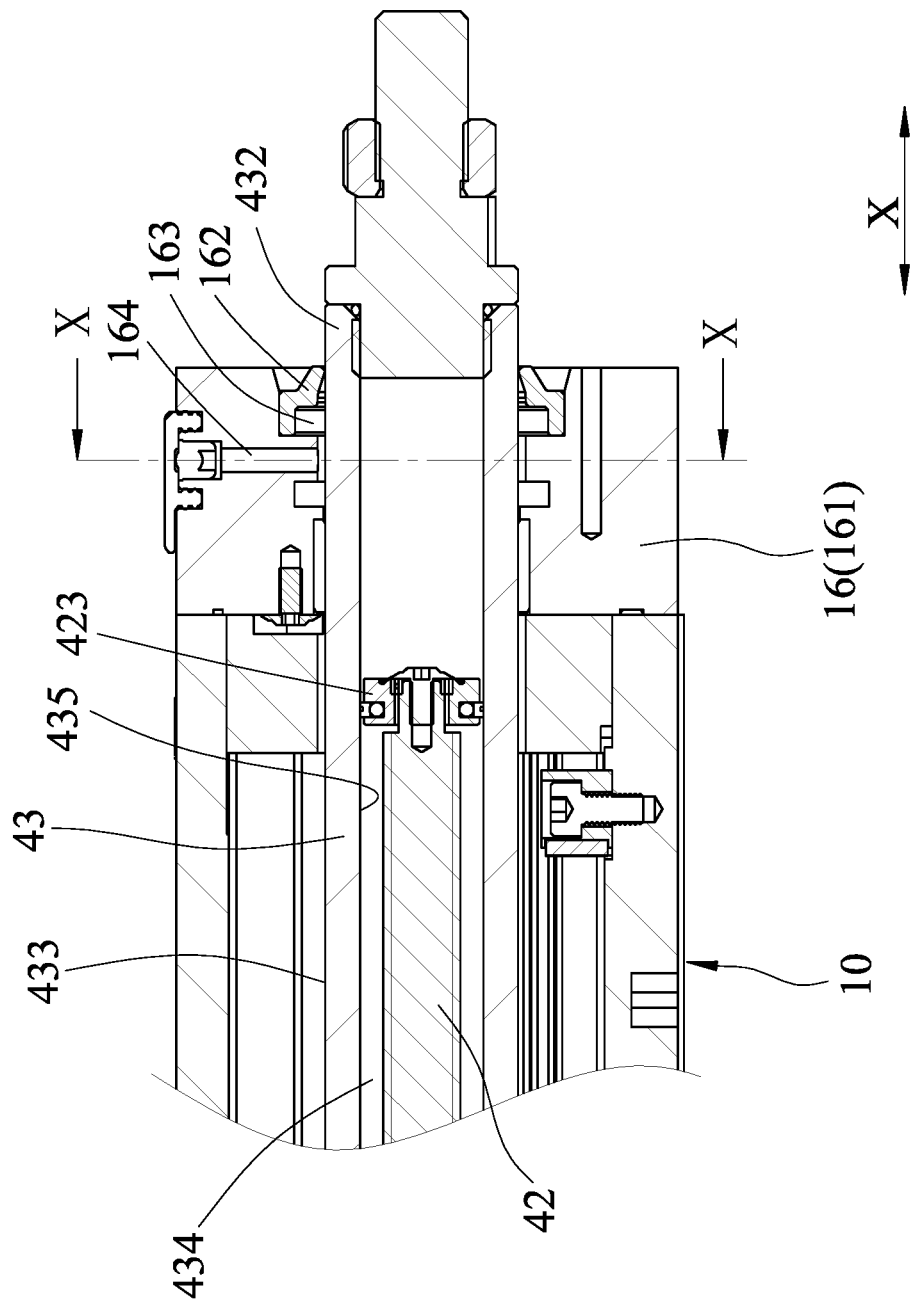
FIG. 7 is another enlarged fragmentary sectional view of FIG. 5.
Figure 10:
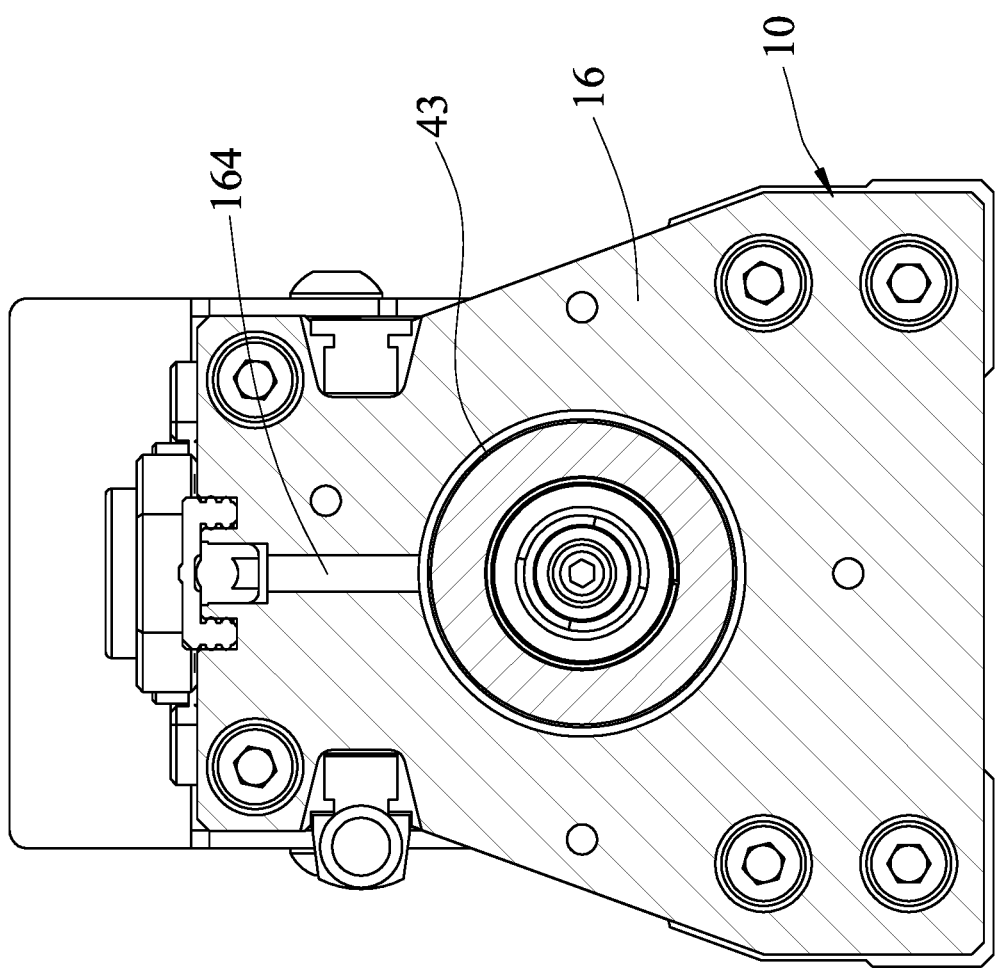
FIG. 10 is a sectional view taken along line X-X of FIG. 7.
Figure 11:
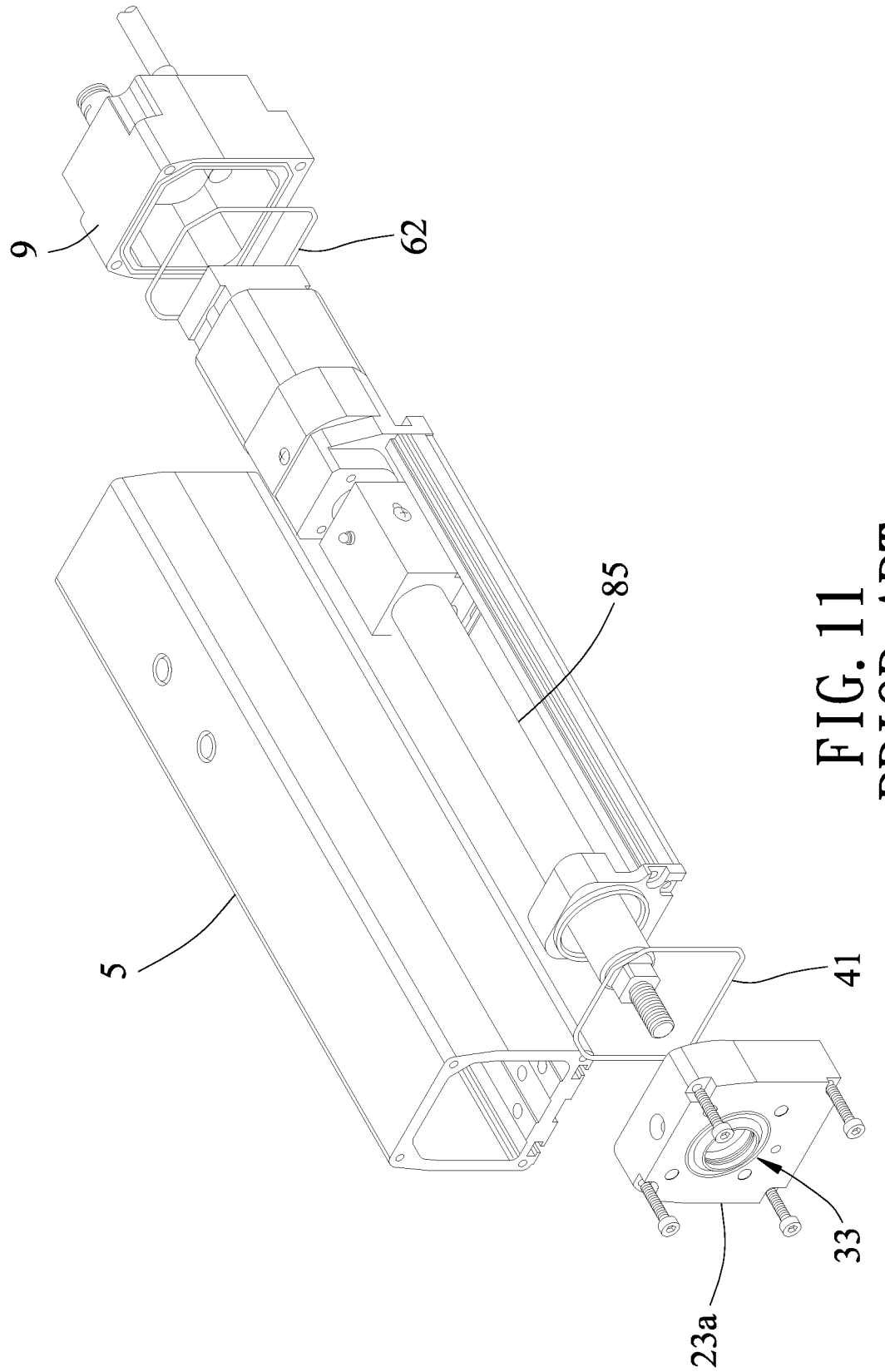
FIG. 11 is an exploded view illustrating an actuator device disclosed in JP5968732.
Figure 12:
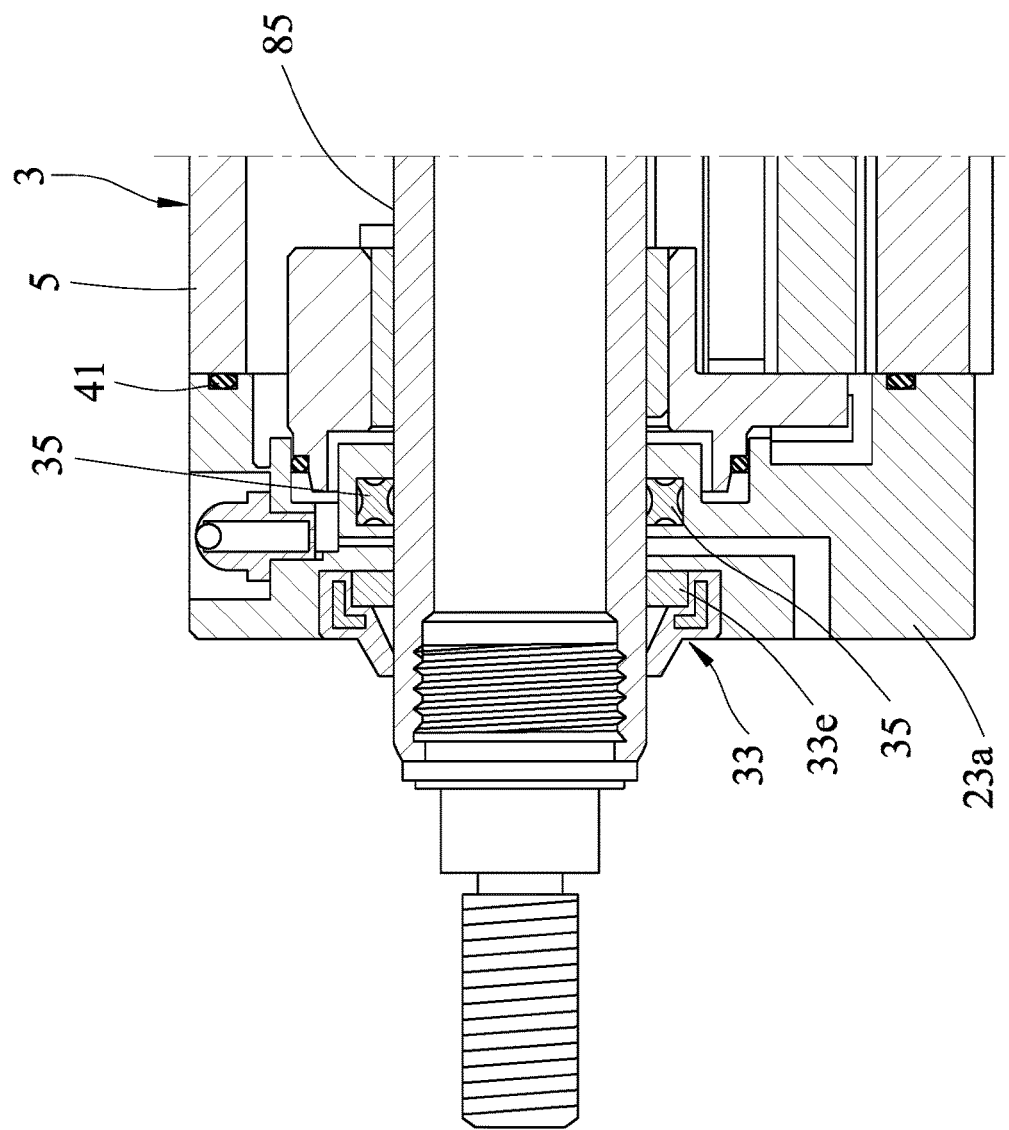
FIG. 12 is a partly section view illustrating the actuator device disclosed in JP5968732.

Referring to FIGS. 7 and 10 in combination with FIG. 2, the second end subunit 16 is opposite to the first end subunit 12 in the longitudinal direction (X) and is connected to the base body 11. The second end subunit 16 includes a main body 161 and an end cap 162. The main body 161 is formed with a second oil injection hole 164. The end cap 162 is mounted to the main body 161. The main body 161 and the end cap 162 cooperatively define an oil storage space 163. The oil storage space 163 communicates with the external environment through the second oil injection hole 164.

Figure 3:
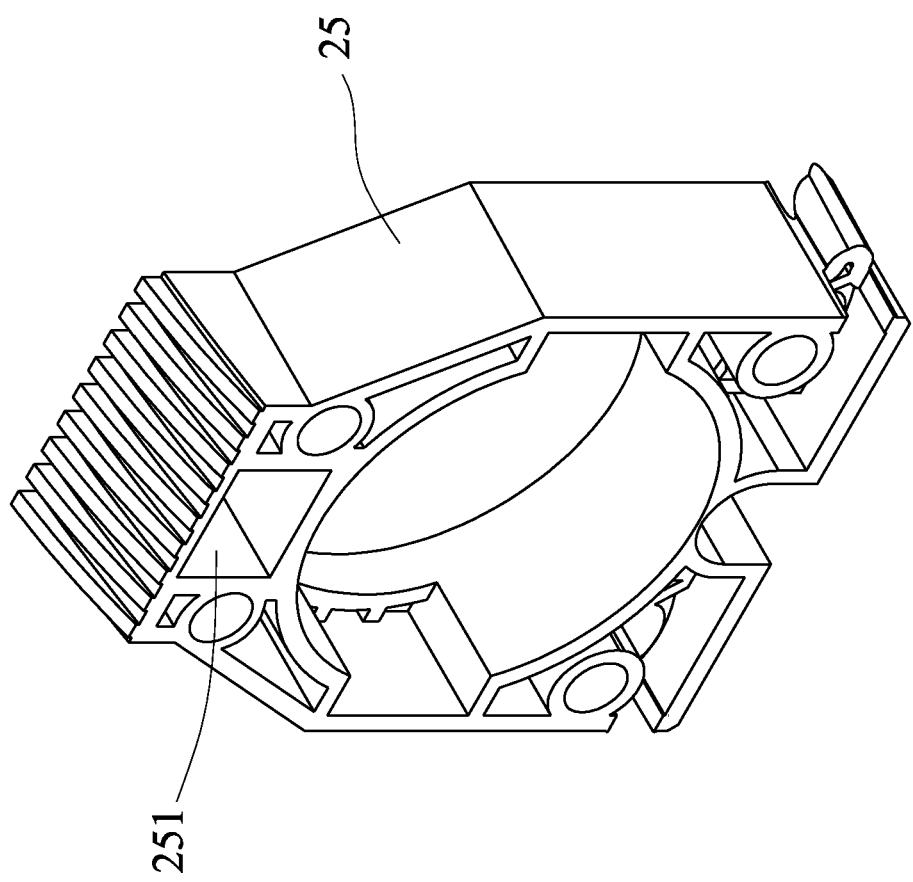
FIG. 3 is a perspective view of the embodiment illustrating an oil guiding seat of the actuator device.
Figure 4:
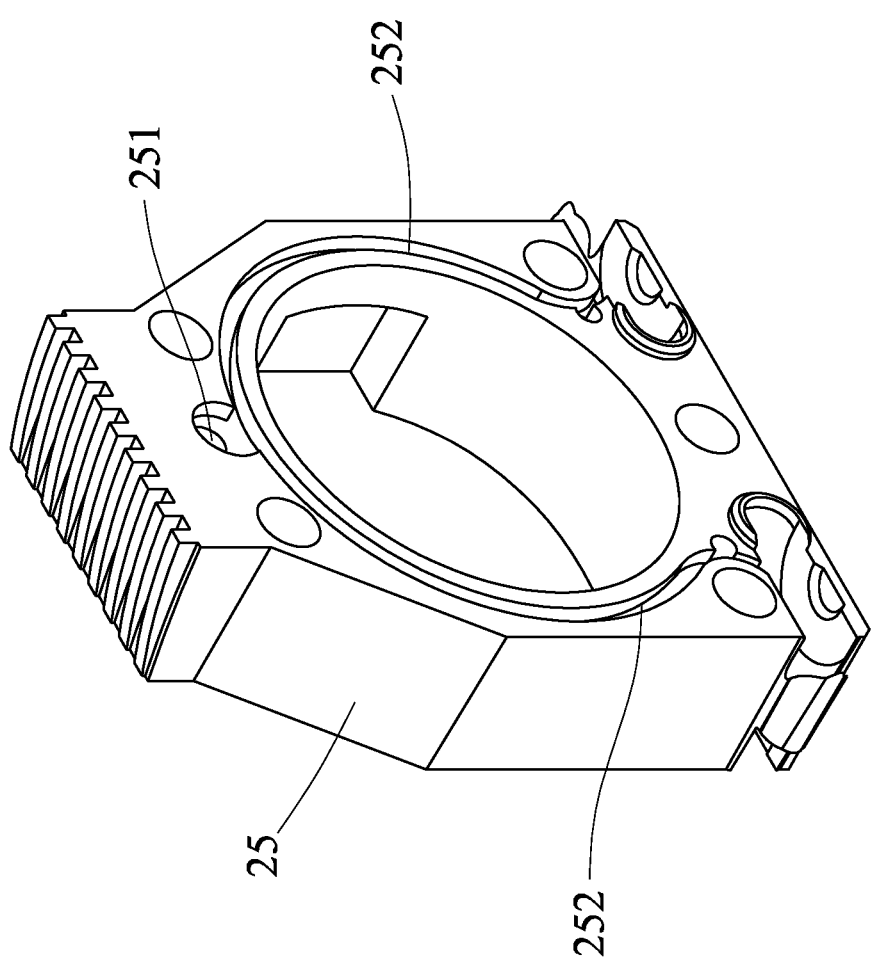
FIG. 4 is another angle view of the oil guiding seat shown in FIG. 3.
Figure 5:
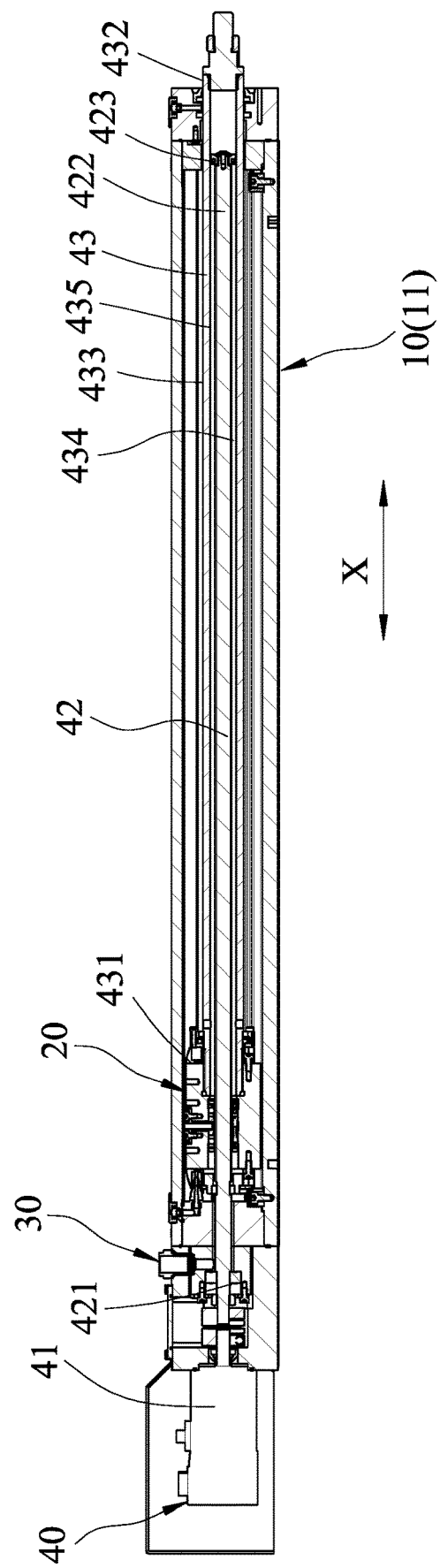
FIG. 5 is a schematic sectional view illustrating the actuator device of the embodiment.
Figure 6:
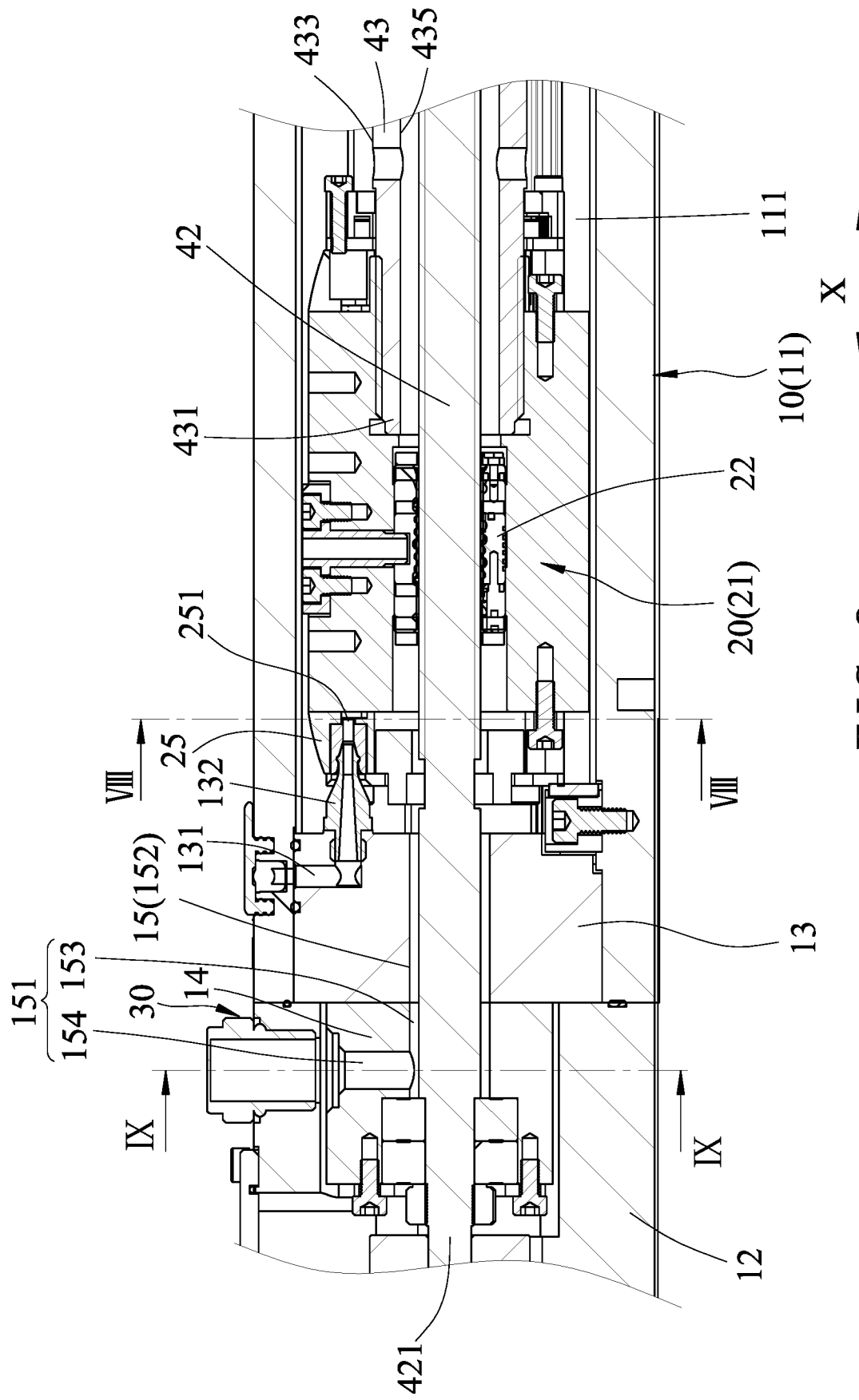
FIG. 6 is an enlarged fragmentary sectional view of FIG. 5.
Figure 8:
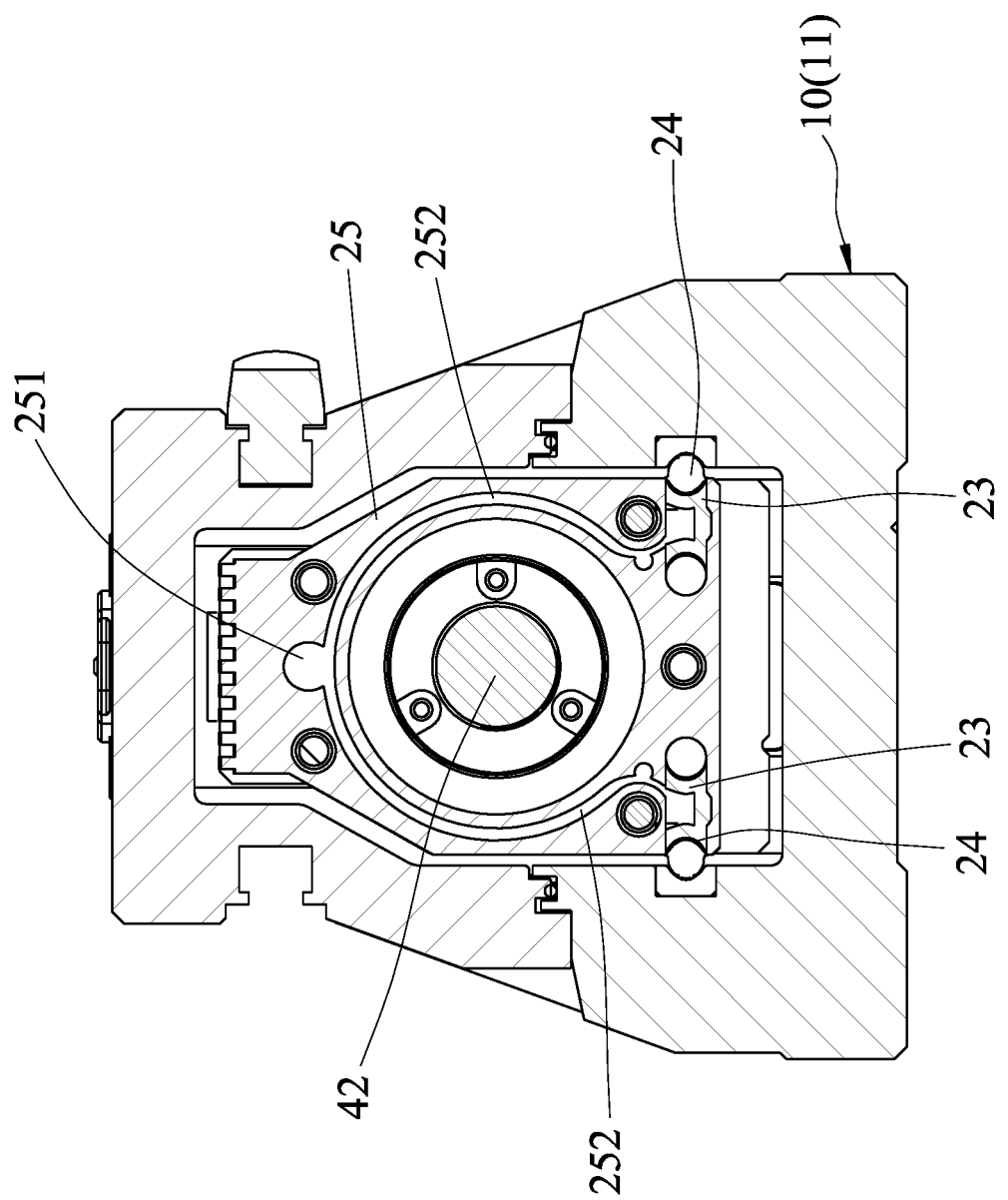
FIG. 8 is a sectional view taken along line VIII-VIII of FIG. 6.
Figure 9:
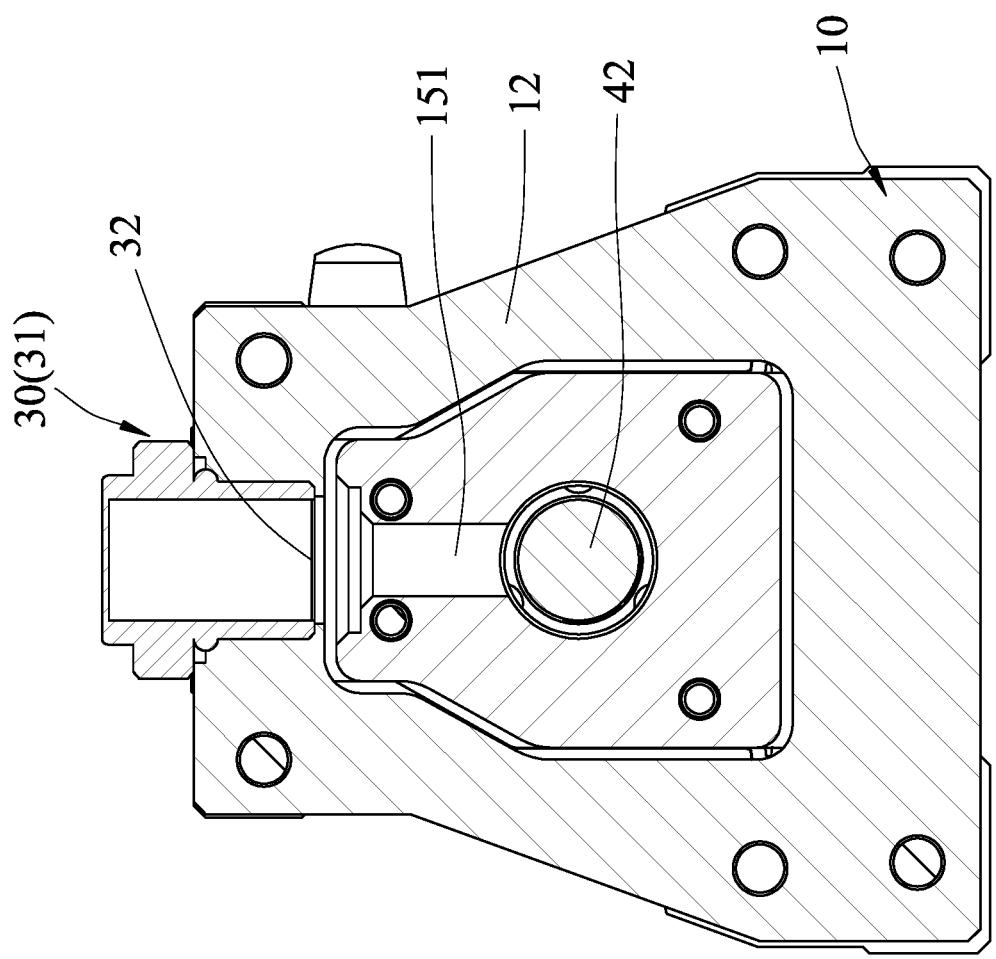
FIG. 9 is a sectional view taken along line IX-IX of FIG. 6.

Referring to FIGS. 5, 6, and 8, the sliding unit 20 is mounted to the base unit 10, is slidable in the longitudinal direction (X) relative to the base unit 10, and has a slide table 21, a nut seat 22, two ball circulating mechanisms 23, two ball sets 24, and an oil guiding seat 25. The nut seat 22 is connected to the slide table 21, and is situated between the slide table 21 and the base unit 10. The two ball circulating mechanisms 23 are mounted to the slide table 21. The two ball sets 24 are respectively mounted in the ball circulating mechanisms 23. The oil guiding seat 25 is connected to the slide table 21. In this embodiment, referring to FIGS. 3 and 4, the oil guiding seat 25 has a connection hole 251 and an oil guiding groove 252. The connection hole 251 is aligned with the first oil injection nozzle 132, and is connected to the slide table 21 and the base unit 10. The oil guiding groove 252 communicates with the connection hole 251 and the ball circulating mechanisms 23.

The pressure relief unit 30 is mounted in the transverse part 154 of the first hole segment 151 of the ventilation hole 15, and is operable for allowing air to be discharged in a unidirectional manner from the receiving space 111 to the external environment. The pressure relief unit 30 includes a valve body 31 and a unidirectional diaphragm 32 mounted in the valve body 31. The unidirectional diaphragm 32 is operable for allowing the air to be discharged in the unidirectional manner from the receiving space 111 to the external environment. The unidirectional diaphragm 32 is made of a polymer thin film material such as a polytetrafluoroethylene material.

The driving unit 40 is mounted to the base unit 10, and is operable for driving movement of the sliding unit 20 in the longitudinal direction (X) relative to the base unit 10. The driving unit 40 includes a driving member 41, a threaded shaft 42, and a tube 43.

The driving member 41 is disposed on a side of the air discharge seat 14 opposite to the oil injection seat 13.

The threaded shaft 42 is threadedly connected to the nut seat 22, and is driven rotatably by the driving member 41 to drive movement of the sliding unit 20 along the threaded shaft 42. In this embodiment, the threaded shaft 42 has a coupling portion 421, a terminal portion 422, and a sliding ring 423. The coupling portion 421 extends through the second hole segment 152 and the longitudinal part 153 of the first hole segment 151 of the ventilation hole 15. The terminal portion 422 is opposite to the coupling portion 421. The sliding ring 423 is connected to the terminal portion 422.

The tube 43 is sleeved on the threaded shaft 42, is co-movable with the sliding unit 20, and has an inner end portion 431, an outer end portion 432, a first surrounding surface 433, and a second surrounding surface 435. The inner end portion 431 is connected to the slide table 21. The outer end portion 432 is opposite to the inner end portion 431 in the longitudinal direction (X) and extends outwardly of the second end subunit 16. The first surrounding surface 433 extends from the inner end portion 431 to the outer end portion 432. The second surrounding surface 435 extends from the inner end portion 431 to the outer end portion 432, is surrounded by the first surrounding surface 433, and defines an inner hole 434. In this embodiment, the sliding ring 423 is slidable along the inner hole 434, and has an outer surface that is in sliding contact with the second surrounding surface 435 of the tube 43. By virtue of the sliding ring 423 being connected to the terminal portion 422 of the threaded shaft 42, the terminal portion 422 may be stabilized. The oil storage space 163 is disposed adjacent to the first surrounding surface 433 of the tube 43 and is in fluid communication with the second oil injection hole 164. The second oil injection hole 164 is adapted for allowing oil supply therethrough to the tube 43 and the end second subunit 16. The end cap 162 may provide a sealing function to prevent foreign objects, water droplets and dust on the tube 43 from entering the base unit 10.

Referring back to FIGS. 1, 5, 6, and 7, after assembly of the actuator device of the disclosure is completed, the sliding unit 20 is slidably mounted to the base unit 10. By virtue of the threaded shaft 42 threadedly connected to the nut seat 22, when the driving member 41 is activated, rotation of the threaded shaft 42 is driven by the driving member 41 to drive movement of the sliding unit 20 along the threaded shaft 42, thereby completing operations of processing and conveying as expected.

During movement of the sliding unit 20 relative to the base unit 10, the tube 43 co-movable with the sliding unit 20 is moved relative to the second end subunit 16 and the threaded shaft 42. Meanwhile, because an outer surface of the sliding ring 423 is in sliding contact with the second surrounding surface 435 of the tube 43, and because the sliding ring 423 is connected to the terminal portion 422 of the threaded shaft 42, stability of the terminal portion 422 may be increased. When the sliding unit 20 is moved to the oil injection seat 13 of the first end subunit 12, the connection hole 251 of the oil guiding seat 25 is aligned with and directly communicate with the first oil injection nozzle 132, and the sliding unit 20 is at an oil injection position (a restoration position). Accordingly, when an oil nozzle (not shown) is inserted into the first oil injection hole 131, oil may be injected into the oil injection nozzle 132. After being injected into the oil injection nozzle 132, oil may be supplied to the ball circulating mechanisms 23 through the oil guiding groove 252, thereby providing lubrication between the slide table 21 and the base unit 10.

The oil nozzle (not shown) may be also inserted into the second oil injection hole 164 to inject oil into the oil storage space 163. Because the oil storage space 163 is disposed adjacent to the first surrounding surface 433 of the tube 43, oil may be supplied to the tube 43 and the end second subunit 16, thereby providing lubrication between the tube 43 and the base unit 10.

During movement of the sliding unit 20 relative to the base unit 10, air flows may be generated inside the receiving space 111, thereby producing pressure inside the receiving space 111. By virtue of the unidirectional diaphragm 32 mounted in the valve body 31 for allowing the air to be discharged in the unidirectional manner from the receiving space 111 to the external environment, the pressure inside the receiving space 111 may be adjusted by the pressure relief unit 30 while the unidirectional diaphragm 32 may prevent water and dust from entering the receiving space 111 through the pressure relief unit 30.

By virtue of the overall structural configuration of the actuator device of the disclosure, the actuator device has an ingress protection 68 (IP68) rating. That is to say, the actuator device of disclosure is water resistant in fresh water to a maximum depth of 1.5 meters for up to 30 minutes, and is dustproof.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An actuator device comprising:
   a base unit including
      a base body that extends in a longitudinal direction and that defines a receiving space,
      a first end subunit that is connected to said base body and that has
         a ventilation hole adapted to communicate said receiving space with an external environment,
         a first oil injection hole, and
         a first oil injection nozzle extending from said first oil injection hole into said receiving space, and
      a second end subunit that is opposite to said first end subunit in the longitudinal direction and that is connected to said base body;
   a sliding unit mounted to said base unit, slidable in the longitudinal direction relative to said base unit, and having
      a slide table,
      a nut seat that is connected to said slide table, and
      a connection hole that is aligned with said first oil injection nozzle and that is connected to said slide table and said base unit;
   a pressure relief unit mounted in said ventilation hole and operable for allowing air to be discharged in a unidirectional manner from said receiving space to the external environment; and
   a driving unit mounted to said base unit, and operable for driving movement of said sliding unit in the longitudinal direction relative to said base unit;
   wherein said first end subunit further has an oil injection seat that is fixed to said base body, and an air discharge seat that is fixed to said oil injection seat and that is opposite to said base body;
   wherein said ventilation hole has a first hole segment that is formed in said air discharge seat, and a second hole segment that is formed in said oil injection seat;
   wherein said first oil injection hole is formed in said oil injection seat;
   wherein said driving unit includes
      a driving member that is disposed on a side of said air discharge seat opposite to said oil injection seat,
      a threaded shaft that is threadedly connected to said nut seat and that is driven rotatably by said driving member to drive movement of said sliding unit along said threaded shaft, and
      a tube that is sleeved on said threaded shaft, that is co-movable with said sliding unit, and that has
         an inner end portion connected to said slide table,
         an outer end portion opposite to said inner end portion in the longitudinal direction and extending outwardly of said second end subunit,
         a first surrounding surface extending from said inner end portion to said outer end portion, and
         a second surrounding surface extending from said inner end portion to said outer end portion, surrounded by said first surrounding surface, and defining an inner hole;
   wherein said first hole segment of said ventilation hole has a longitudinal part that extends through said air discharge seat in the longitudinal direction, and a transverse part that is transverse to said longitudinal part, said pressure relief unit being mounted in said transverse part; and
   wherein said threaded shaft has
      a coupling portion that extends through said second hole segment and said longitudinal part of said first hole segment,
      a terminal portion that is opposite to said coupling portion, and
      a sliding ring that is connected to said terminal portion, that is slidable along said inner hole, and that has an outer surface being in sliding contact with said second surrounding surface of said tube.

2. The actuator device as claimed in claim 1, wherein said second end subunit has a second oil injection hole that is adapted for allowing oil supply therethrough to said tube and said second end subunit.

3. The actuator device as claimed in claim 2, wherein said second end subunit includes a main body formed with said second oil injection hole, and an end cap mounted to said main body, said main body and said end cap cooperatively defining an oil storage space that is disposed adjacent to said tube and that is in fluid communication with said second oil injection hole.

4. The actuator device as claimed in claim 1, wherein:
said sliding unit further has two ball circulating mechanisms that are mounted to said slide table, two ball sets that are respectively mounted in said ball circulating mechanisms, and an oil guiding seat that is connected to said slide table and that has said connection hole; and
said oil guiding seat further has an oil guiding groove that communicates with said connection hole and said ball circulating mechanisms.

5. The actuator device as claimed in claim 1, wherein said pressure relief unit includes a valve body and a unidirectional diaphragm mounted in said valve body, said unidirectional diaphragm being operable for allowing the air to be discharged in the unidirectional manner from said receiving space to the external environment.

6. The actuator device as claimed in claim 5, wherein said unidirectional diaphragm is a thin film made from a polymer material.

7. The actuator device as claimed in claim 5, wherein said unidirectional diaphragm is made of a polytetrafluoroethylene material.

* * * * *